(12) United States Patent
Lee

(10) Patent No.: US 10,419,271 B2
(45) Date of Patent: Sep. 17, 2019

(54) PUBLIC TRANSPORTATION FEE PAYMENT SYSTEM AND OPERATING METHOD THEREOF

(71) Applicant: LG CNS CO., LTD., Seoul (KR)

(72) Inventor: Yongkyuu Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 752 days.

(21) Appl. No.: 14/586,801

(22) Filed: Dec. 30, 2014

(65) Prior Publication Data

US 2016/0189139 A1 Jun. 30, 2016

(51) Int. Cl.
*H04L 12/24* (2006.01)
*G06Q 20/04* (2012.01)
*G06Q 20/34* (2012.01)
*G06Q 20/20* (2012.01)
*G07B 15/02* (2011.01)

(52) U.S. Cl.
CPC ....... *H04L 41/0668* (2013.01); *G06Q 20/045* (2013.01); *G06Q 20/202* (2013.01); *G06Q 20/352* (2013.01); *G07B 15/02* (2013.01)

(58) Field of Classification Search
USPC ......................................................... 235/380
See application file for complete search history.

(56) References Cited

U.S. PATENT DOCUMENTS

| | | | | |
|---|---|---|---|---|
| 7,356,372 B1 * | 4/2008 | Duncan | ............... | G07C 9/00103 340/506 |
| 2005/0240492 A1 * | 10/2005 | Grdina | ............... | G06Q 30/0225 705/27.1 |
| 2008/0270487 A1 * | 10/2008 | Weijun | ................ | G06F 11/1482 |
| 2011/0060649 A1 * | 3/2011 | Dunk | ................. | G06Q 30/0255 705/14.53 |
| 2014/0337234 A1 * | 11/2014 | Tang | ..................... | H04L 9/3265 705/71 |
| 2015/0006592 A1 * | 1/2015 | Avati | .................. | G06F 16/1865 707/826 |
| 2015/0187177 A1 * | 7/2015 | Warner | ............... | G07F 17/3244 463/25 |
| 2015/0188991 A1 * | 7/2015 | Huang | ................ | H04L 67/2861 709/217 |

* cited by examiner

*Primary Examiner* — Michael G Lee
*Assistant Examiner* — David Tardif

(57) ABSTRACT

A system includes one or more processors, and one or more non-transitory computer-readable media having stored thereon a program, which, when executed, causes the one or more processors to perform a method of a distributed server of a transportation system. A method includes monitoring whether a failure has occurred on a communication network between the distributed server and a central server, searching for another distributed server capable of communicating with the central server, based on a result of the monitoring, and communicating with the central server using the other distributed server.

20 Claims, 13 Drawing Sheets

PUBLIC TRANSPORTATION FEE PAYMENT SYSTEM AND OPERATING METHOD THEREOF

TECHNICAL FIELD

Various embodiments described in this specification relate to a public transportation fee payment system which includes a distributed server, a central server, and a payment terminal, and an operating method thereof.

BACKGROUND

When a payment terminal reads a card and transmits payment data to a server, the server approves the payment and provides the approval result to the payment terminal. When a plurality of payment terminals simultaneously reads a plurality of cards and transmits data, the server requires a lot of time to process the data, and the processing load is high. In particular, when a failure occurs on a communication line between the server and the payment terminals, the processing load of the server accumulates. In this case, an inquiry about a transaction history and transmission of a response to the inquiry may not be smoothly performed.

SUMMARY

Embodiments of the present disclosure have been made in an effort to continue communication by setting a bypass route between distributed servers when a failure has occurred on a communication network between a central server and one or more of the distributed servers.

In addition, embodiments of the present disclosure have been made in an effort to check a transaction history through a distributed server and provide the result of the check even though a failure has occurred on a communication network between a central server and a payment terminal.

A system in accordance with an embodiment includes one or more processors, and one or more non-transitory computer-readable media having stored thereon a program, which, when executed, causes the one or more processors to perform a method of a distributed server of a transportation system.

A method of a distributed server in accordance with an embodiment includes monitoring whether a failure has occurred on a communication network between the distributed server and a central server, searching for another distributed server capable of communicating with the central server, based on a result of the monitoring, and communicating with the central server using the other distributed server.

A method of a payment terminal in accordance with an embodiment includes receiving data including payment data from a card tagged to a card reader of the payment terminal, monitoring whether a failure has occurred on a communication network between the payment terminal and a central server, searching for a first distributed server capable of communicating with the central server, among a plurality of distributed servers within the communication network, based on a result of the monitoring, and processing a payment with the central server using the first distributed server.

According to an embodiment of the present disclosure, a public transportation fee payment system may continue communication by setting a bypass route between distributed servers during communication network failure.

According to another embodiment of the present disclosure, a central server and distributed servers may be connected through a wired communication network, and the distributed servers and payment terminals may be connected through a wireless communication network. Thus, it is possible to reduce costs compared to when a wired network is used for communication between the central server and the payment terminals.

According to another embodiment of the present disclosure, as a public transportation fee payment system performs communication using distributed servers, the public transportation fee payment system may not be affected by a failure on a communication network between the central server and a payment terminal, and is able to stably check a transaction history and provide the result.

DESCRIPTION OF EMBODIMENTS

Hereafter, embodiments of the present disclosure will be described below with reference to the accompanying drawings.

The following embodiments may be modified in various manners. Embodiments should not be construed as being limited descriptions provided herein, but may include all modifications, equivalents or substitutes thereof.

The terms used to describe embodiments are used only for explanatory purposes, and do not limit embodiments. Terms in a singular form may include plural forms unless the contrary is indicated. In this specification, it should be understood that the meaning of "include/comprise" or "have" specifies a property, a figure, a step, a process, an element, a component, or a combination thereof which is described in the specification, but does not exclude one or more other properties, numbers, steps, processes, elements, components, or combinations thereof.

In the accompanying drawings, duplicated descriptions of elements appearing in more than one drawing may be omitted. In the following embodiments, descriptions of publicly known functions or configurations may be omitted so that the subject matter of the present disclosure is not unnecessarily obscured.

Figure 1:
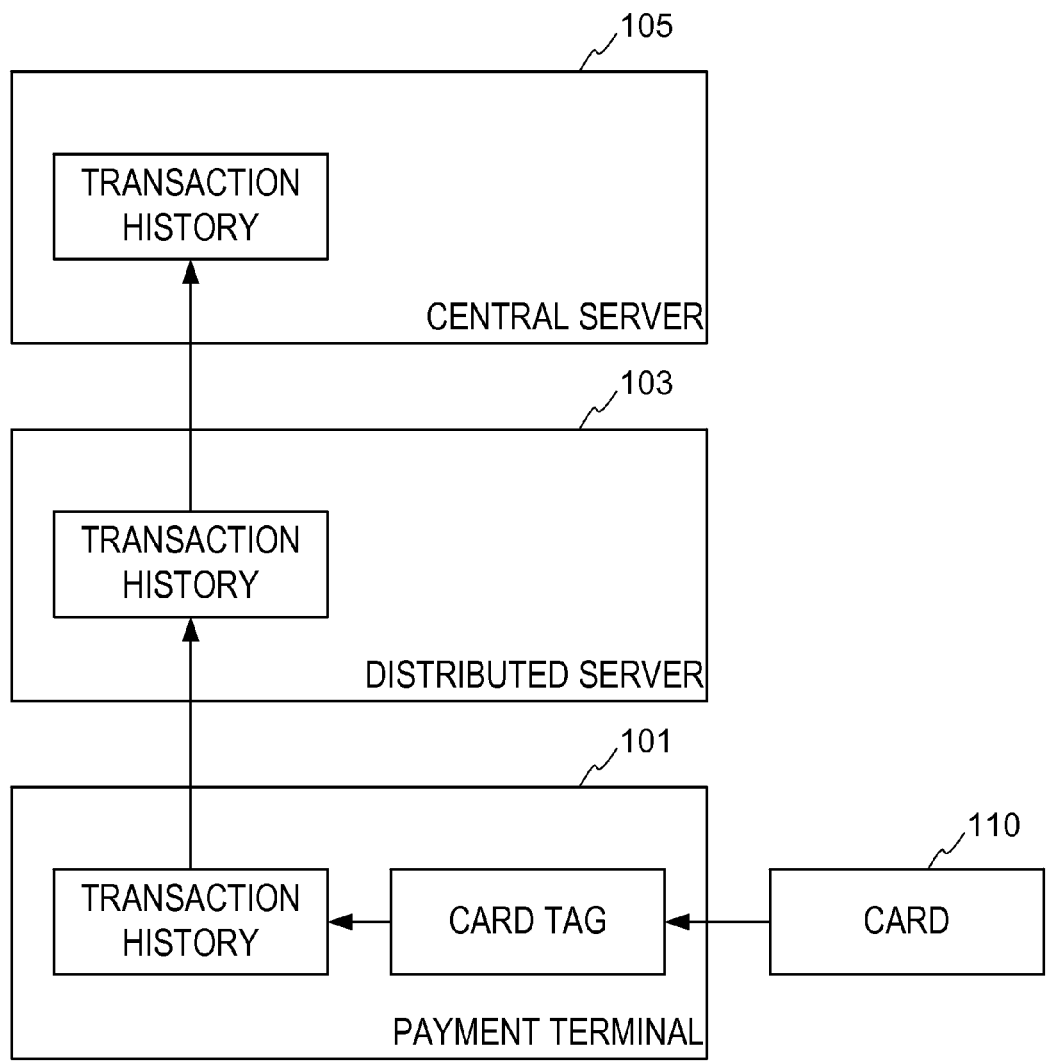
FIG. 1 illustrates a configuration of a public transportation fee payment system according to an embodiment of the present disclosure and an operating method for components of a public transportation fee payment system according to an embodiment.

FIG. 1 illustrates a configuration of a public transportation fee payment system according to an embodiment of the present disclosure and an operating method of components of the public transportation fee payment system according to an embodiment.

Referring to FIG. 1, a public transportation fee payment system according to an embodiment of the present disclosure may include a payment terminal 101, a distributed server 103, and a central server 105.

The payment terminal 101 may request the distributed server 103 or the central server 105 to process a payment for a tagged card.

One or more payment terminals 101 may be installed at various places where payments may be made for services related public transportation. Such places may include transportation stations, transportation terminals, vehicles, garages or the like. Each payment terminal includes a card reading device to read a payment card.

The payment terminal 101 may monitor whether a failure has occurred on a communication network between the payment terminal 101 and the central server 105. Based on the monitoring result, the payment terminal 101 may search for a distributed server 103 which can communicate with the central server 105, and process a payment with the central server 105 through the found distributed server 103.

One or more distributed servers 103 may be distributed and installed at various places such as transportation stations or transportation terminals. The distributed server 103 may be configured as a mobile type or stationary type.

The distributed server 103 may operate as a communication (interconnection) server which interconnects communication between the central server 105 and the payment terminal 101 when a failure has occurred on the communication network between the central server 105 and the payment terminal 101.

The distributed server 103 may monitor whether a failure has occurred on a communication network between the central server 105 and the distributed server 103, and search for another distributed server that can communicate with the central server 105, when a failure occurs. The distributed server 103 may communicate with the central server 105 using the other distributed server.

The payment terminal 101 and the distributed server 103 may be connected to each other through a wireless network such as a cellular network, WiFi, a trunked radio service (TRS), or near-field communication.

The distributed server 103 and the central server 105 may perform wired communication or wireless communication through a wired or wireless network.

The central server 105 may forward operating information to the distributed server 103. The operating information may include information related to card transactions (e.g., a transaction history, payment data, etc.) and information on one or more terminals 101. The information related to card transactions may include a hot list, a black list, valid communication ticket information and the like. The information on one or more terminals 101 may include, for example, terminal information used to operate the one or more terminals 101.

A method by which the central server 105 distributes operating information through a distributed server in accordance with an embodiment will be described below with reference to FIG. 8.

Referring to FIG. 1, when a user tags a card 110 on the payment terminal 101, the payment terminal 101 may store data, including transaction history and payment data of the card 110.

The payment terminal 101 may transmit the stored data to the distributed server 103, and the distributed server 103 may cache the data received from the payment terminal 101.

The distributed server 103 may transmit the data received from the payment terminal 101 to the central server 105, and the central server 105 may store the data received from the distributed server 103.

The central server 105 may process the payment by approving or disapproving the payment data of the card 110 tagged on the payment terminal 101, based on the data received from the distributed server 103.

Depending on embodiments, the distributed server 103 receiving the payment data of the card 110 from the payment terminal 101 may determine whether to approve or disapprove the payment data prior to the central server 105, and transmit the process result (e.g., the approval/disapproval result) to the payment terminal 101 and the central server 105.

In an embodiment, since the transaction history is stored in the payment terminal 101 and the distributed server 103 as well as the central server 105, it is possible to minimize data transmission/reception with the central server 105. Furthermore, when a failure occurs in communication with the central server 105, the payment terminal 101 or the distributed server 103 may check the transaction history.

Figure 2:
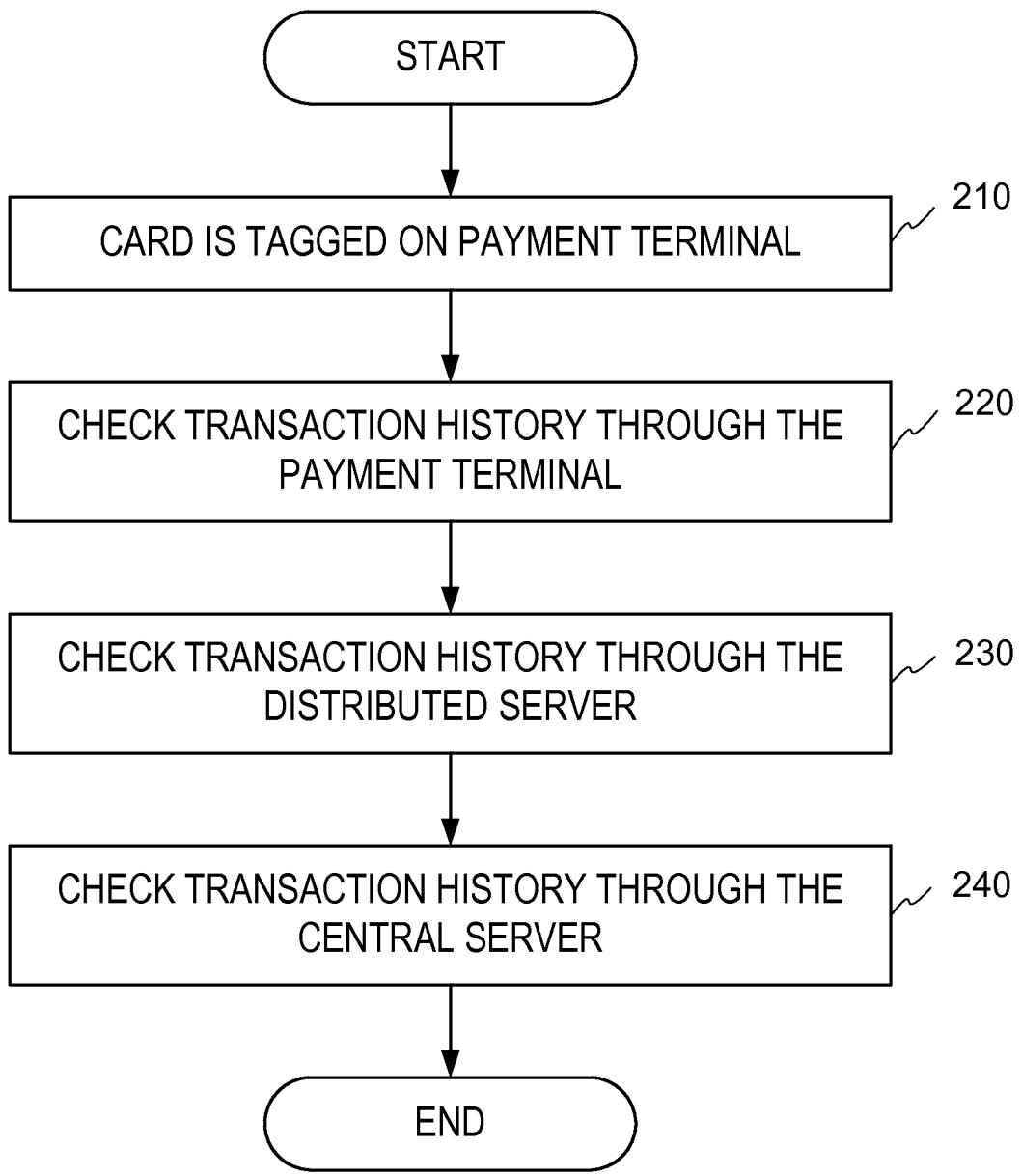
FIG. 2 is a flowchart illustrating an operating method for components of a public transportation fee payment system according to an embodiment of the present disclosure.

FIG. 2 illustrates an operating method for components of a public transportation fee payment system according to an embodiment of the present disclosure.

FIG. 2 illustrates a process in which a transaction history of a payment card is checked through each of a payment terminal, a distributed server, and a central server in a public transportation fee payment system according to an embodiment of the present disclosure.

At step 210, a card is tagged to a payment terminal. At steps 220 and 230, after a user tags the card on the payment terminal, a public transportation fee payment system according to an embodiment of the present disclosure may preferentially check a transaction history through the payment terminal and the distributed server, before checking the transaction history through the central server. In an embodiment, the transaction history may be checked in the payment terminal first and then in the distributed server, or the transaction history may be checked in the payment terminal and the distributed server at the same time.

After that, at step 240, the transaction history may be changed in the central server.

In the embodiment illustrated in FIG. 2, since the transaction history is checked through the payment terminal and the distributed server before connection to the central server, it is possible to prevent or reduce the risk of double approval (or double payment), which may occur due to a communication failure or process time difference, for example.

Figure 3:
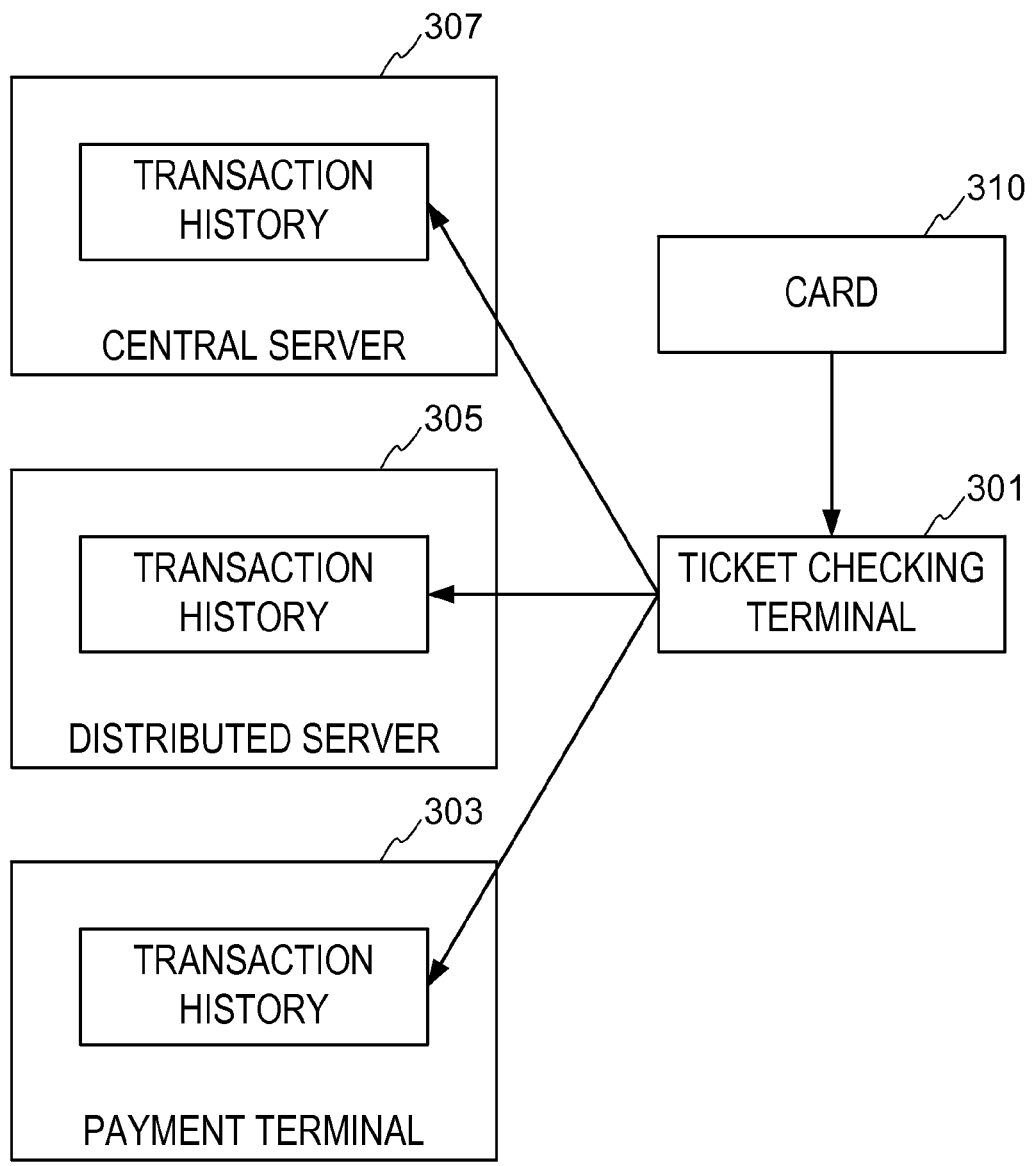
FIG. 3 illustrates an operating method for components of a public transportation fee payment system according to another embodiment of the present disclosure.

FIG. 3 illustrates an operating method for components of a public transportation fee payment system according to another embodiment of the present disclosure.

Referring to FIG. 3, a public transportation fee payment system according to an embodiment of the present disclosure may include a ticket checking terminal 301, a payment terminal 303, a distributed server 305, and a central server 307.

When a ticket checker tags a user's card 310 on the ticket checking terminal 301, the ticket checking terminal 301 may check a transaction history of the card 310 through the payment terminal 303 and the distributed server 305, before checking the transaction history through the central server 307. In an embodiment, the checking of the transaction history through the payment terminal 303 and the distributed server 305 may be sequentially performed through the payment terminal 303 and the distributed server 305 or performed at the same time.

In addition to checking the transaction history, the ticket checking terminal 301 may request the distributed server 305 to process a payment for a transportation fee, in place of the central server 307.

Figure 4:
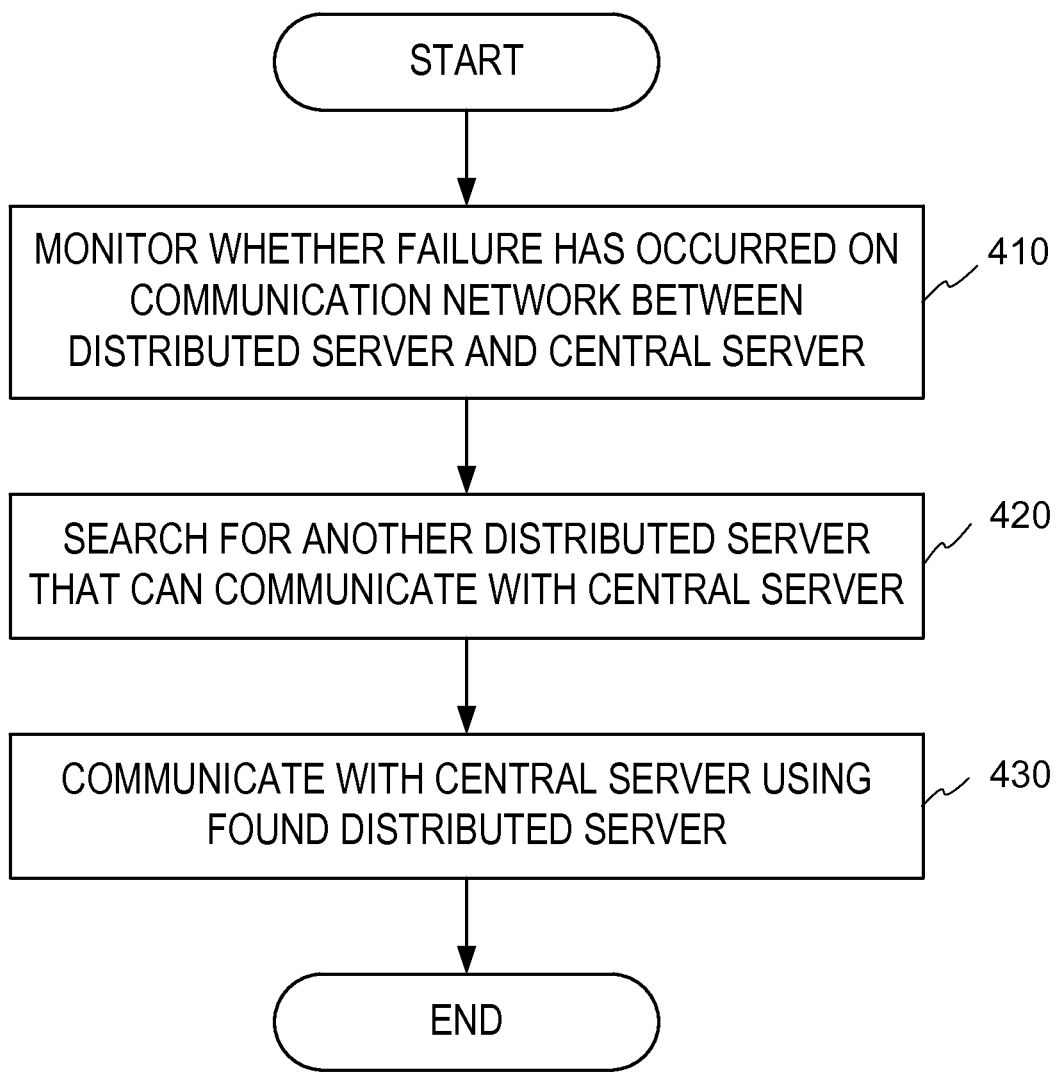
FIG. 4 is a flowchart illustrating an operating method of a distributed server of a public transportation fee payment system according to an embodiment of the present disclosure.

FIG. 4 is a flowchart illustrating an operating method of a distributed server of a public transportation fee payment system according to an embodiment of the present disclosure.

Referring to FIG. 4, at step 410, the distributed server monitors whether a failure has occurred on a communication network between the distributed server and a central server.

At step 420, if the distributed server determines that a failure has occurred, the distributed server searches for another distributed server that can communicate with the central server.

At step 430, the distributed server may communicate with the central server by using the other distributed server found in the searching process. In an embodiment, the distributed server may set a bypass route passing through the other distributed server, which was found in the searching process, by using an ad-hoc function, and communicate with the central server through the bypass route. A method by which the distributed server generates a bypass route in accordance with an embodiment will be described below with reference to FIG. 7.

Figure 5:
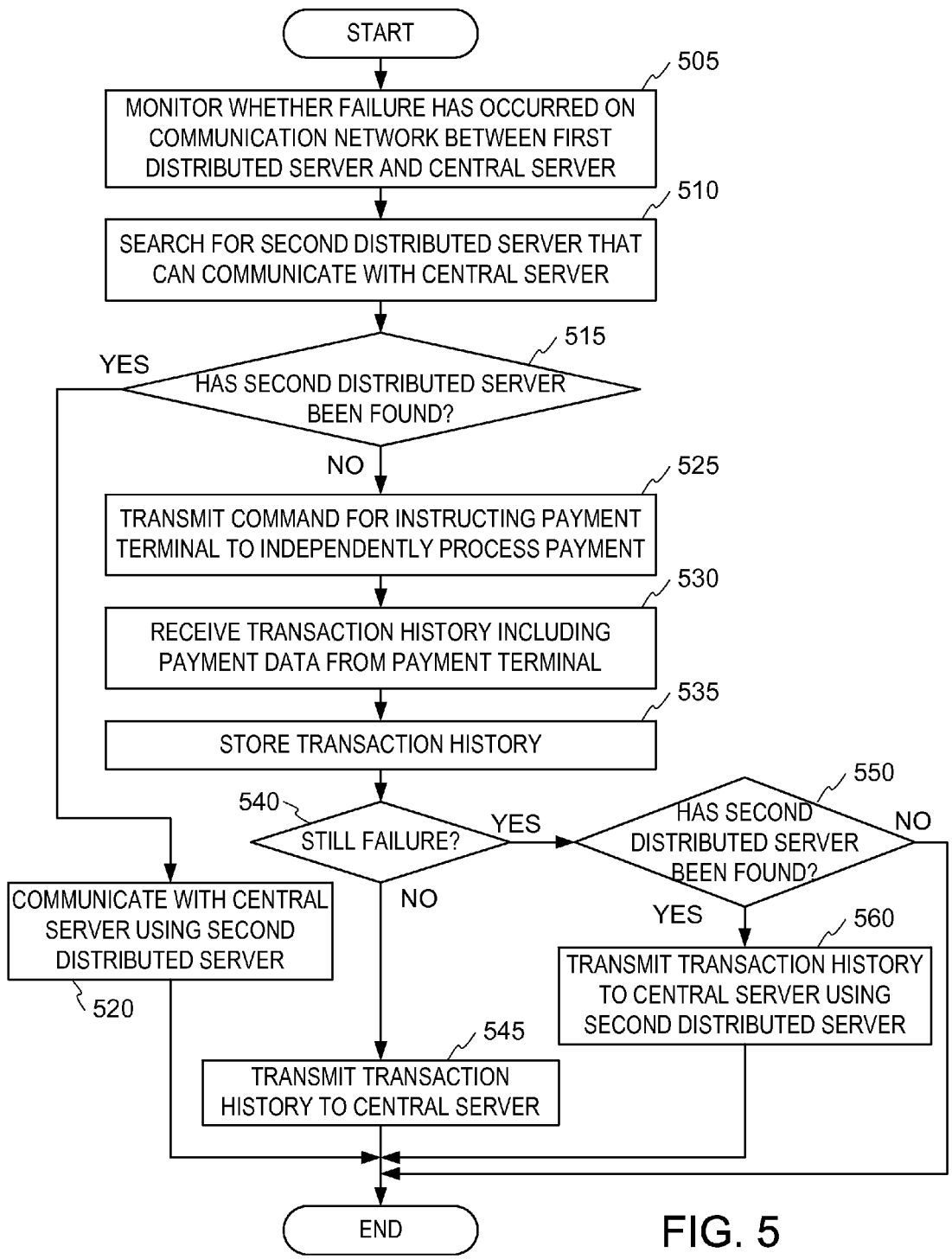
FIG. 5 is a flowchart illustrating an operating method of a distributed server of a public transportation fee payment system according to another embodiment of the present disclosure.

FIG. 5 is a flowchart illustrating an operating method of a distributed server of a public transportation fee payment system according to another embodiment of the present disclosure.

Referring to FIG. 5, at step 505, a first distributed server monitors whether a failure has occurred on a communication network between the first distributed server and a central server.

At step 510, the first distributed server may search for another distributed server (e.g., a second distributed server) that can communicate with the central server, based on the monitoring result.

At step 515, the first distributed server may determine whether a second distributed server capable of communicating with the central server was found within a preset time.

At step 520, if it is determined at step 515 that a second distributed server has been found within the preset time, the first distributed server may communicate with the central server using the second distributed server.

At step 525, if it is determined at step 515 that a second distributed server has not been found within the preset time, the first distributed server may transmit a command for instructing a payment terminal to independently process a payment.

At steps 530 and 535, the first distributed server may receive a transaction history including payment data from the payment terminal, which has processed the payment independently according to the independent processing command, and store the received transaction history.

At step 540, the first distributed server may determine if the failure still exists on the communication network between the central server and the first distributed server.

At step 545, if it is determined at step 540 that there is no longer a failure on the communication network, the first distributed server may transmit the transaction history to the central server.

At step 550, if it is determined at step 540 that there is still a failure on the communication network, the first distributed server may determine whether a second distributed server capable of communicating with the central server has been found.

At step 560, if it is determined at step 550 that a second distributed server has been found, the distributed server may transmit the transaction history to the central server using the second distributed server.

If it is determined at step 550 that a second distributed server has not been found, the process ends.

Figure 6:
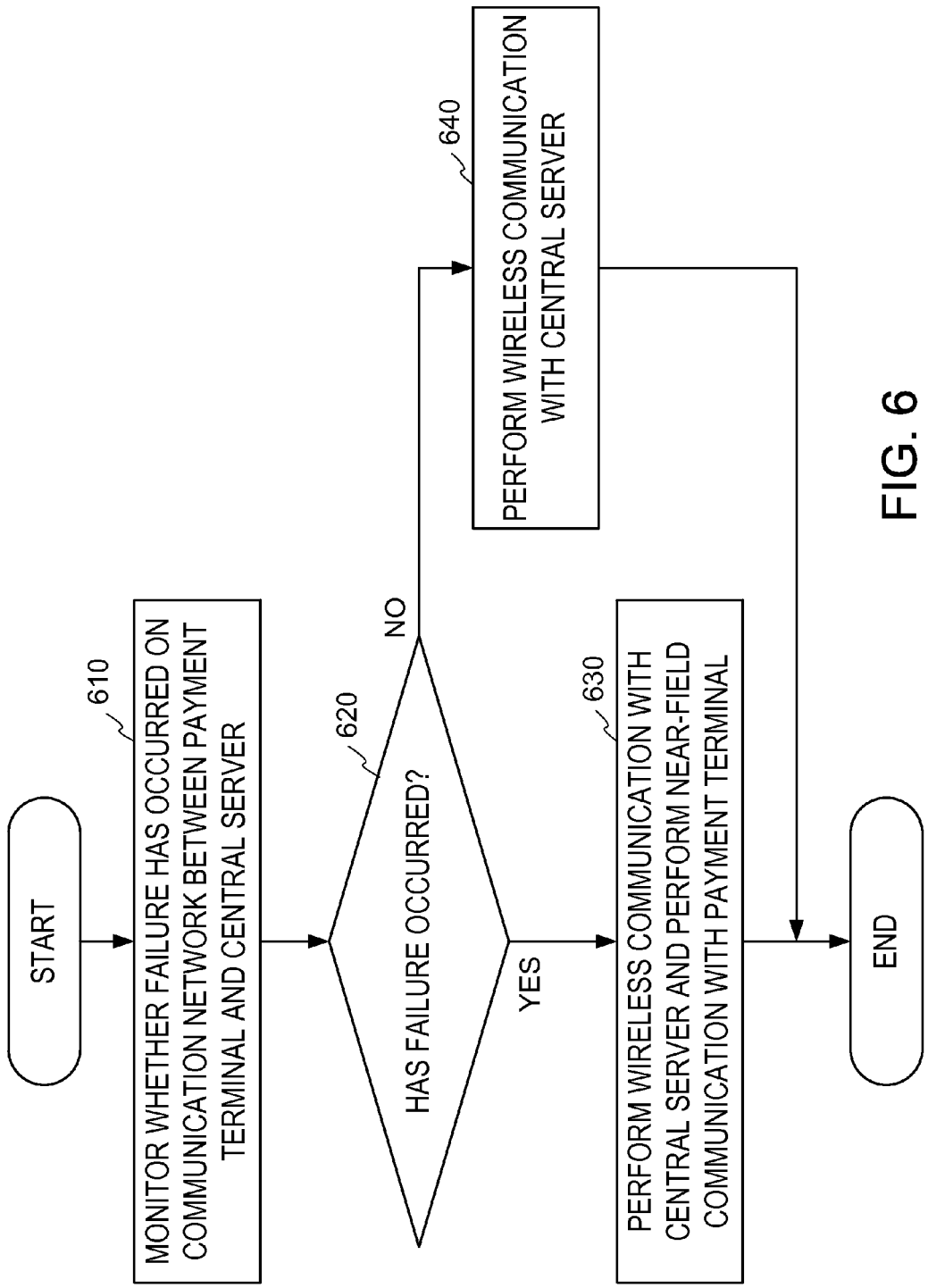
FIG. 6 is a flowchart illustrating an operating method of a distributed server of a public transportation fee payment system according to another embodiment of the present disclosure.

FIG. 6 is a flowchart illustrating an operating method of a distributed server of a public transportation fee payment system according to another embodiment of the present disclosure.

Referring to FIG. 6, at step 610, a distributed server according to an embodiment of the present disclosure may monitor whether a failure has occurred on a communication network between a payment terminal and a central server.

At step 620, based on the monitoring result of step 610, the distributed server may determine whether a failure has occurred on a communication network between the payment terminal and the central server.

At step 630, if it is determined at step 620 that a failure has occurred, the distributed server may perform wireless communication with the central server, and perform near-field communication with the payment terminal. In an embodiment, if it is determined at step 620 that a failure has occurred on a network between the payment terminal and the central server, e.g., if there is a failure on a wired network or a type of wireless network, the distributed server may switch to near-field communication with the payment terminal from another type of wireless communication or wired communication. In addition, in an embodiment, if it is determined at step 620 that a failure has occurred, the distributed server may back up payment data of the payment terminal.

On the other hand, at step 640, if it is determined at step 620 that a failure has not occurred, the distributed server may perform wireless communication with the central server.

Figure 7:
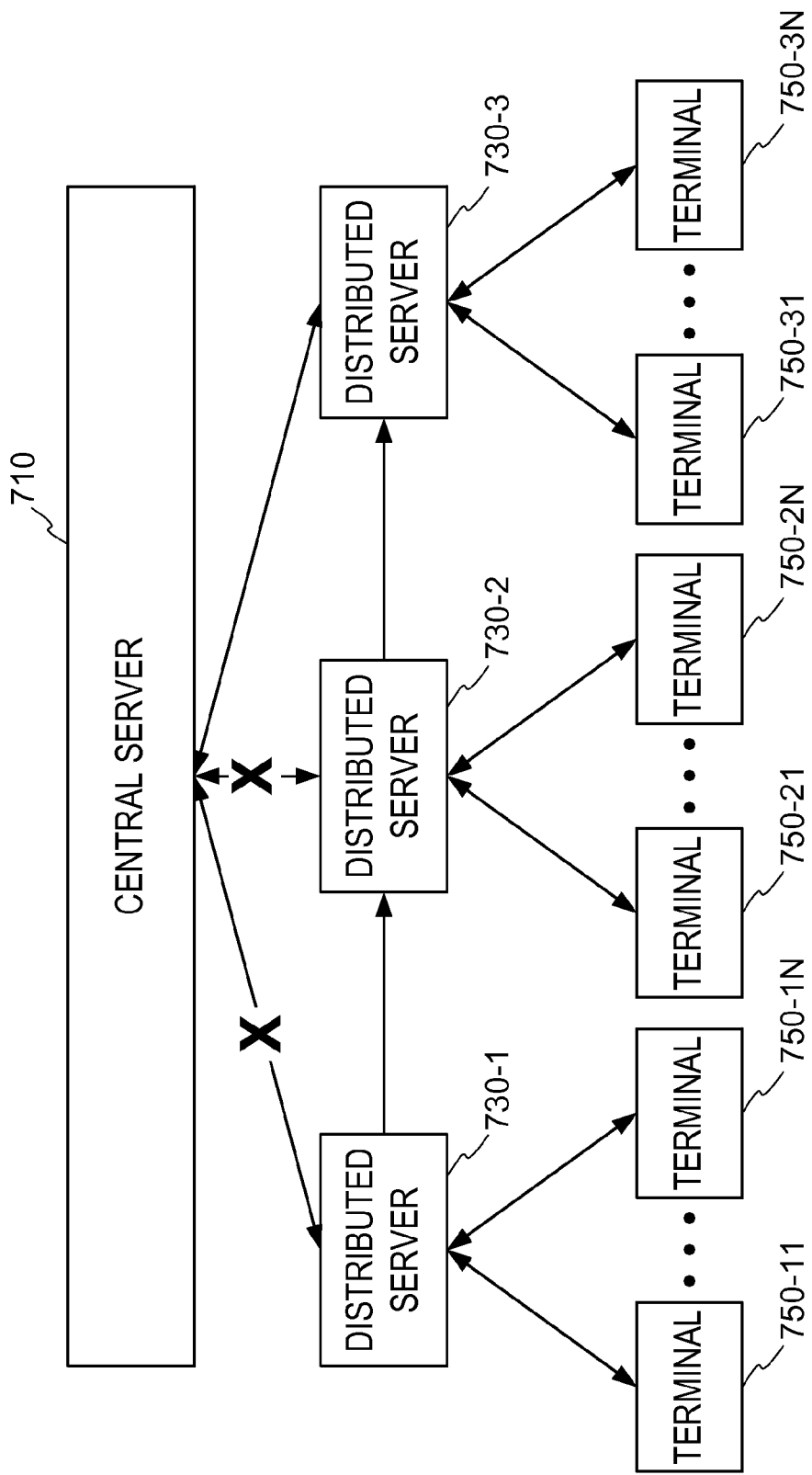
FIG. 7 illustrates a method by which a distributed server generates a bypass route when a communication failure occurs between a central server and distributed servers in a distributed processing system according to an embodiment of the present disclosure.

FIG. 7 illustrates a method by which a distributed server generates a bypass route when communication failure occurs between a central server and distributed servers in a distributed processing system according to an embodiment of the present disclosure.

FIG. 7 illustrates a central server 710, a plurality of distributed servers 730-1 to 730-3, and a plurality of payment terminals 750-11 to 750-1N, 750-21 to 750-2N, and 750-31 to 750-3N, where 'N' represents a positive integer. Hereafter, for convenience of description, a payment terminal may be referred to with reference simply to numeral 750. As shown in FIG. 7, if a communication failure occurs between the central server 710 and one or more of the distributed servers 730-1 to 730-3 such that communication cannot be performed therebetween, the failure is designated by an 'X' on the corresponding route.

If communication is disconnected between the central server 710 and distributed servers 730-1 and 730-2 among the distributed servers 730-1 to 730-3, the disconnected distributed servers 730-1 and 730-2 may search for another distributed server 730-3 that can communicate with the central server 710, and communicate with the central server 710 through the distributed server 730-3. In an embodiment, to communicate with the central server 710 through the distributed server 730-3, the distributed servers 730-1 and 730-2 may each set a bypass route using an ad-hoc function.

In an embodiment, the ad-hoc function may be a switching function. For example, the distributed servers 730-1 to 730-3 may have a wired/wireless communication switching function. For example, when communication is disconnected during wired communication with the central server 710, the distributed servers 730-1 to 730-3 may switch from wired communication to wireless communication. When communication is disconnected during wireless communication with the central server 710, the distributed servers 730-1 to 730-3 may switch from wireless communication to wired communication to communicate with the central server 710.

In some embodiments, the payment terminals 750 may be able to switch between wired and wireless communication. However, in other embodiments, the payment terminals 750 may have difficulty in switching between wired and wireless communication. In embodiments, the ability of the payment terminals 750 to switch between wired and wireless communication may depend on where they are installed. For example, if the payment terminals 750 are installed in buses or subways, the payment terminals 750 may be unable to switch between wired and wireless communication, or may only be able to do so when the buses or subways are in certain locations. On the other hand, if the payment terminals 750 are installed in stationary garages or transportation terminals, then they may be configured to switch between wired and wireless communication with distributed servers.

When it is not possible for the payment terminals 750 to switch between wired and wireless communication, the payment terminals 750 may independently process payment for a card if communication between the payment terminals 750 and the distributed servers 730-1 to 730-3 is disconnected or if communication between the payment terminals 750 and the central server 710 is disconnected.

Figure 8:
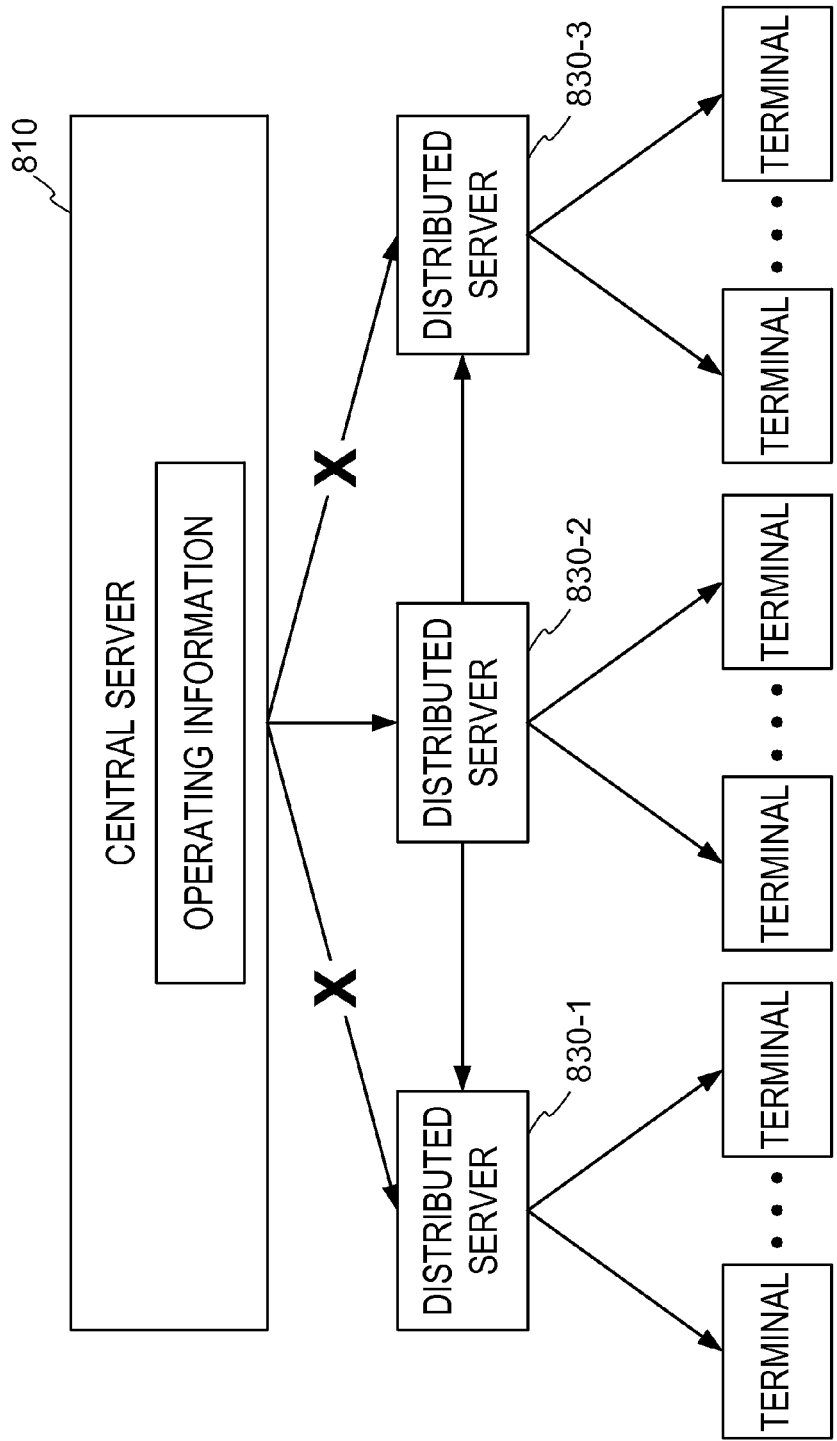
FIG. 8 illustrates a method by which a central server distributes operating information through distributed servers in a distributed processing system according to an embodiment of the present disclosure.

FIG. 8 illustrates a method by which a central server distributes operating information through distributed servers in a distributed processing system according to an embodiment of the present disclosure.

Referring to FIG. 8, a central server 810 may communicate with any one distributed server 830-2 among a plurality of distributed servers 830-1 to 830-3. As shown in FIG. 8, a communication failure between the central server 810 and any of the distributed servers 830-1 to 830-3 is designated by an 'X' on the corresponding route.

The central server 810 may transmit operating information only to a specific distributed server 830-2 among the distributed servers 830-1 to 830-3.

The distributed server 830-2, having downloaded the operating information from the central server 810, may transmit the operating information to the other distributed servers 830-1 and 830-3, which did not receive the operating information from the central server 810 because of the communication failure.

Figure 9:
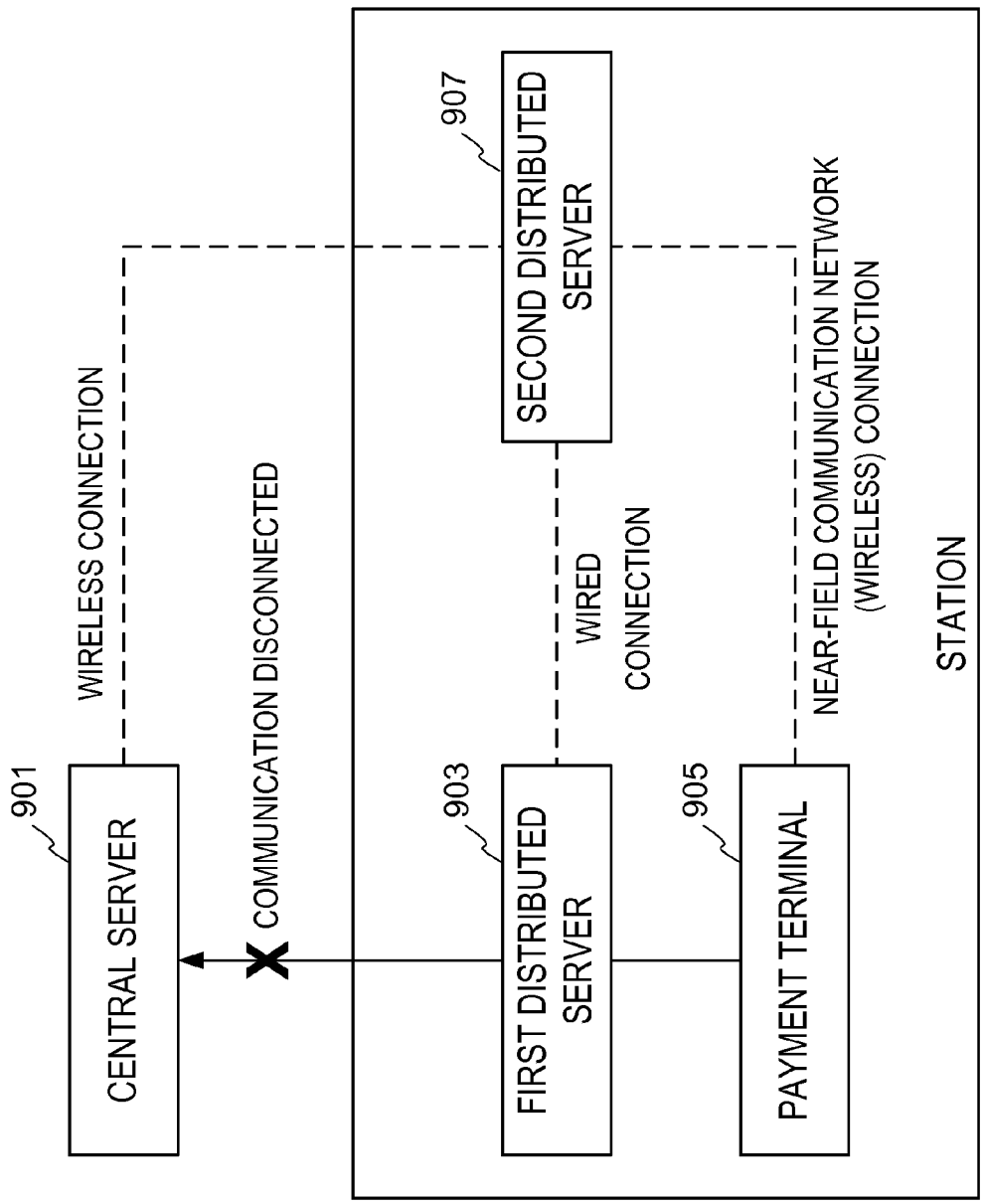
FIG. 9 illustrates an operating method for components of a public transportation fee payment system according to another embodiment of the present disclosure.

FIG. 9 illustrates an operating method for components of a public transportation fee payment system according to another embodiment of the present disclosure.

In an embodiment of FIG. 9, a distributed server performs a function of a communication (interconnection) server.

Referring to FIG. 9, a public transportation fee payment system according to an embodiment of the present disclosure may include a central server 901, a first distributed server 903, a payment terminal 905, and a second distributed server 907.

The second distributed server 907 may operate as a communication (interconnection) server while performing wired/wireless communication, for example, via Ethernet, Wi-fi, Bluetooth, 3G, LTE, or Wibro, or other communication technology.

The second distributed server 907 may include interfaces that are capable of communicating with each of the central server 901, the first distributed server 903, and the payment terminal 905 during a network failure. The second distributed server 907 may be configured as a mobile type or a stationary type.

The second distributed server 907 may have a data backup function that backs up payment data processed by the payment terminal 905, when a failure has occurred on a communication network between the payment terminal 905 and the central server 901.

The second distributed server 907 may monitor whether a failure has occurred on the communication network between the payment terminal 905 and the central server 901. If a failure has occurred, the second distributed server 907 may communicate wirelessly with the central server 901, for example using 3G, LTE, Wibro, or other wireless technology, and perform near-field wireless communication with the payment terminal 905.

When a failure occurs on the communication network between the second distributed server 907 and the central server 901, the second distributed server 907 or the central server 901 may maintain continuous communication by switching to another communication system (for example, from wired communication to wireless communication or from wireless communication to wired communication).

The first distributed server 903 may collect information transmitted from the payment terminal 905 to the central server 901 and store the collected information.

Figure 10:
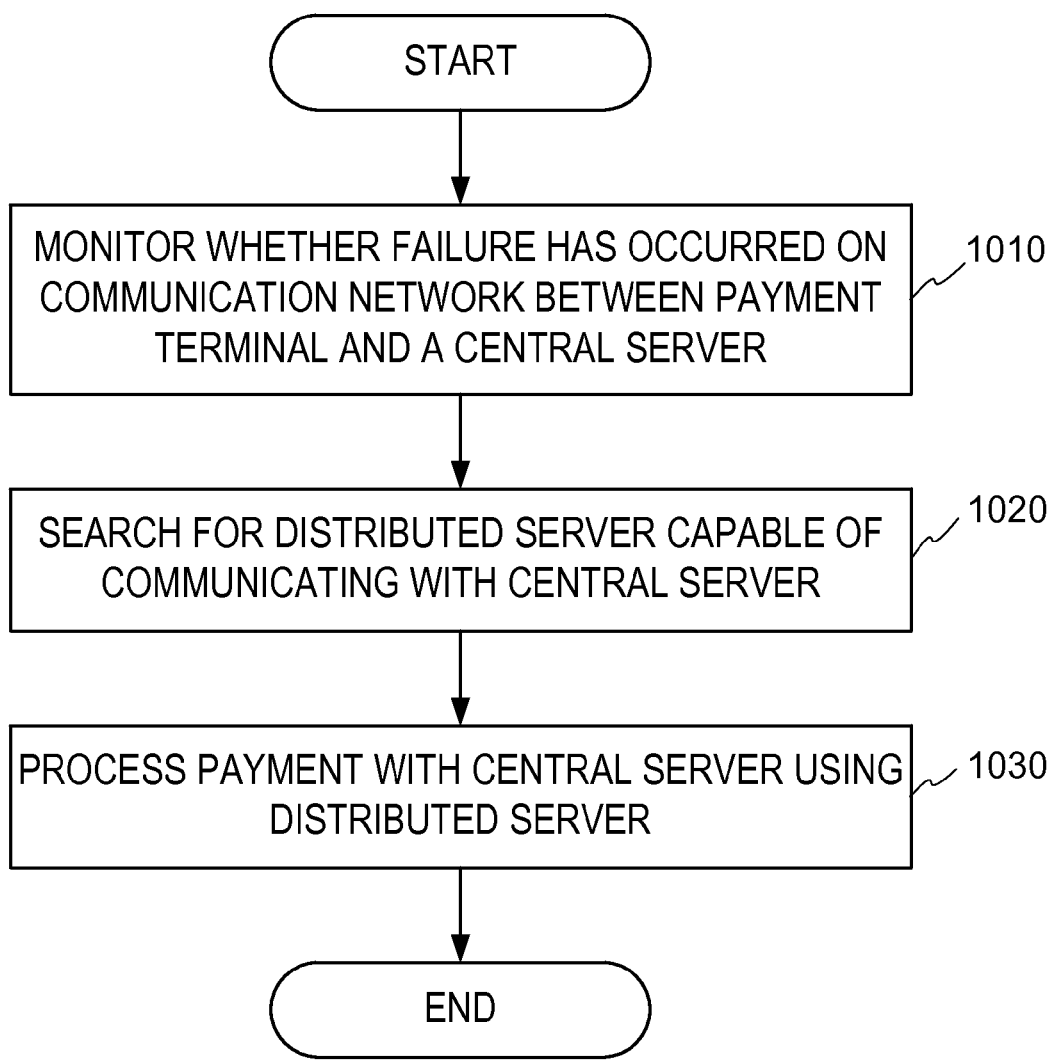
FIG. 10 is a flowchart illustrating an operating method of a payment terminal of a public transportation fee payment system according to an embodiment of the present disclosure.

FIG. 10 is a flowchart illustrating an operating method of a payment terminal of a public transportation fee payment system according to an embodiment of the present disclosure.

Referring to FIG. 10, at step 1010, a payment terminal according to an embodiment of the present disclosure may monitor whether a failure has occurred on a communication network between the payment terminal and a central server.

At step 1020, the payment terminal may search for a distributed server that can communicate with the central server, among a plurality of distributed servers within the communication network, based on the result of monitoring for a communication failure (e.g., if the payment terminal determines that there is a communication failure) at step 1010.

At step 1030, once a distributed server capable of communicating with the central server has been found, the payment terminal may process a payment with the central server by using the found distributed server. At this time, the distributed server may back up transaction history information, including payment data based on approval/disapproval of the payment terminal, if the failure on the communication network between the payment terminal and the central server continues.

Figure 11:
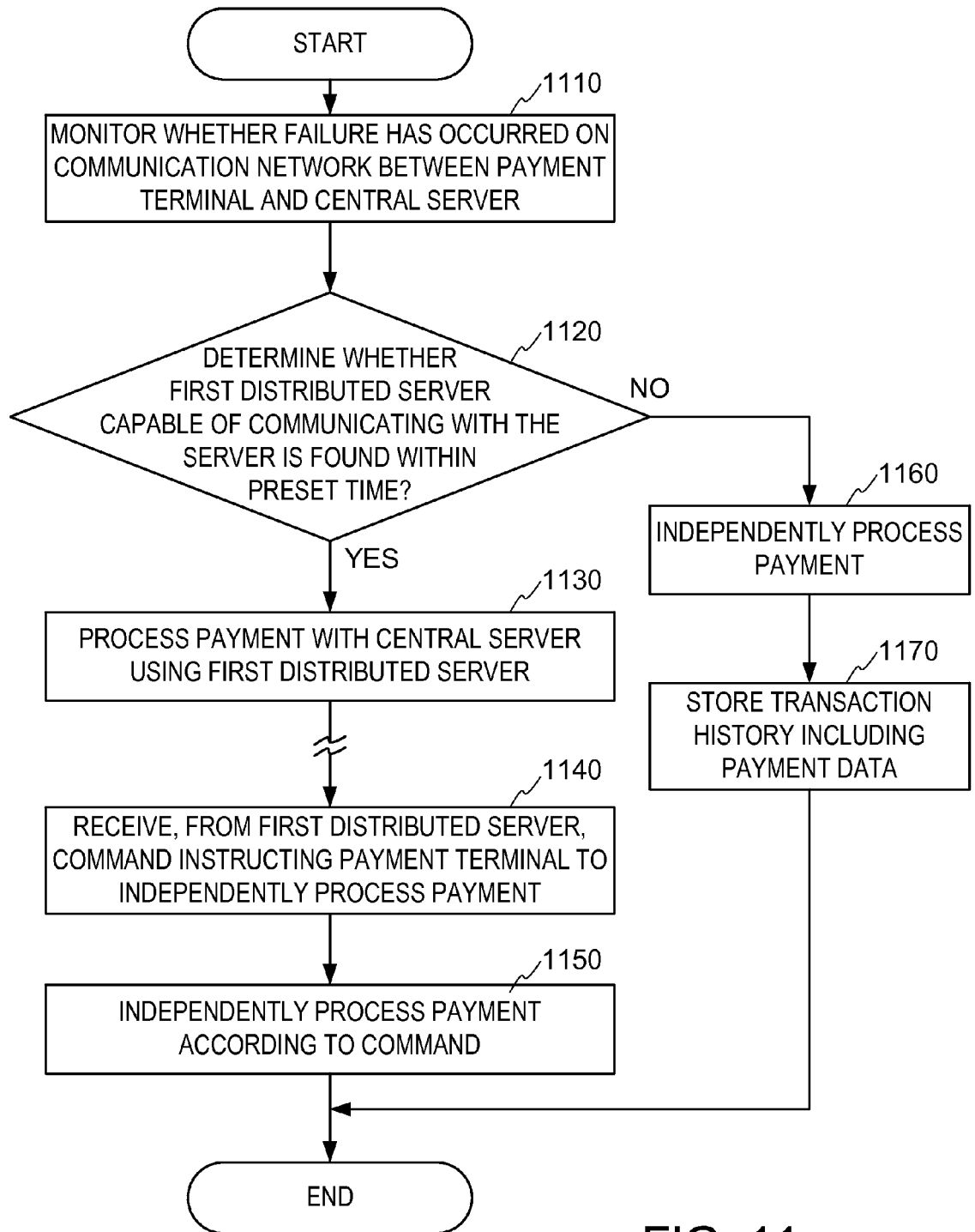
FIG. 11 is a flowchart illustrating an operating method of a payment terminal of a public transportation fee payment system according to another embodiment of the present disclosure.

FIG. 11 is a flowchart illustrating an operating method of a payment terminal of a public transportation fee payment system according to another embodiment of the present disclosure.

Referring to FIG. 11, at step 1110, a payment terminal according to an embodiment of the present disclosure may monitor whether a failure has occurred on a communication network between the payment terminal and a central server.

At step 1120, the payment terminal may determine whether a first distributed server capable of communicating with the central server is found within a preset time.

At step 1130, if it is determined at step 1120 that a first distributed server has been found, the payment terminal may attempt to process a payment with the central server using the first distributed server. In an embodiment, the attempt is successful and the payment is processed with the central server using the first distributed server, and the process ends.

At step 1040, in an embodiment, while the payment terminal attempts to process the payment with the central server using the first distributed server, the payment terminal may receive, from the first distributed server, a command instructing the payment terminal to independently process the payment. In an embodiment, the payment terminal may receive this command from the first distributed server when the first distributed server is unable to communicate with the central server. In an embodiment, if the first distributed server cannot communicate with the central server due to a failure on a communication network therebetween, the first distributed server may search for a second distributed server that can communicate with the central server. If the second distributed server is not found within a preset time, the first distributed server may transmit the command for instructing the payment terminal to independently process the payment.

At step 1150, the payment terminal may independently process the payment according to the command received at step 1140 and transmit a transaction history including payment data based on the processed payment to the first distributed server.

At step 1160, if it is determined at step 1120 that no distributed server capable of communicating with the central server has been found, the payment terminal may independently process the payment.

At step 1170, the payment terminal may store the transaction history including the payment data based on the payment processed at step 1160.

Figure 12:
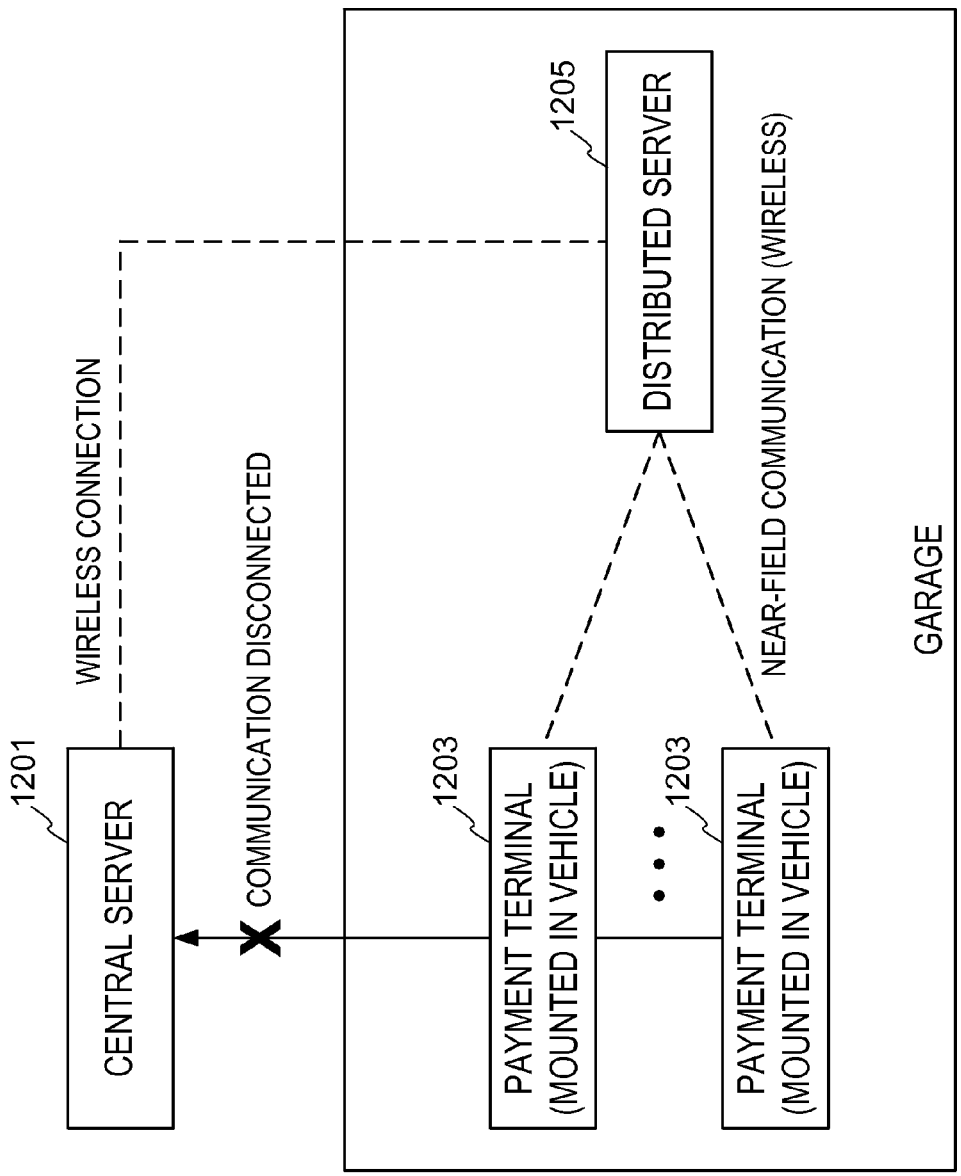
FIG. 12 illustrates an operating method for components of a public transportation fee payment system according to another embodiment of the present disclosure.

FIG. 12 illustrates an operating method for components of a public transportation fee payment system according to another embodiment of the present disclosure.

Referring to FIG. 12, a public transportation fee payment system according to an embodiment of the present disclosure may include a central server 1201, a payment terminal 1203, and a distributed server 1205.

The payment terminal 1203 may be directly mounted on a mode of transportation, such as a bus, taxi, or subway, or installed in a garage or the like. In an embodiment, one or more payment terminals 1203 may be installed in any one location.

If communication between the payment terminal 1203 and the central server 1201 is disconnected due to a failure on a communication network, the distributed server 1205 may be wirelessly connected to the payment terminal 1203 through a near-field communication network. Furthermore, the distributed server 1205 may perform wireless communication with the central server 1201 through technology such as 3G, LTE, Wibro, or other wireless technology.

The payment terminal 1203 may independently process a payment for a card. For example, when a failure has occurred on a communication network between the payment terminal 1203 and the central server 1201 or a failure has occurred on a communication network between the payment terminal 1203 and the distributed server 1205, the payment terminal 1203 may independently process a payment for the card. For example, in an embodiment in which the payment terminal 1203 is mounted on a vehicle, the payment terminal 1203 may have difficulty performing communication with the central server 1202 or the distributed server 1205, and thus, may process the payment independently.

Figure 13:
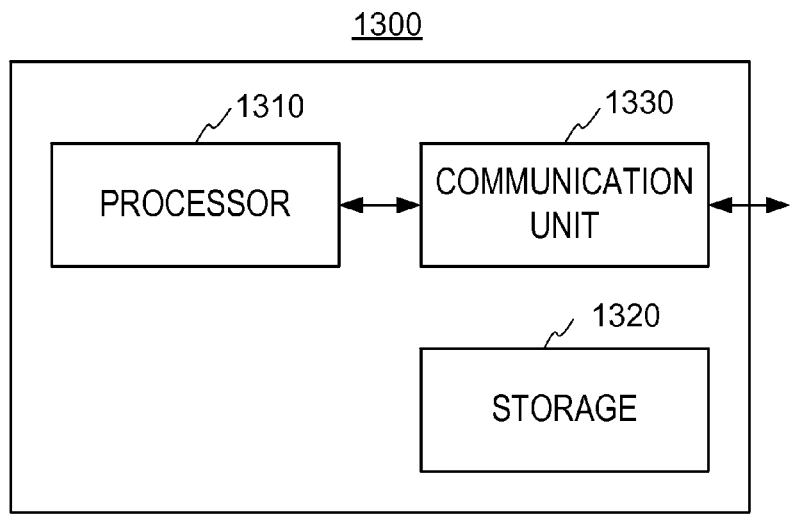
FIG. 13 is a block diagram of a distributed server of a public transportation fee payment system according to an embodiment of the present disclosure.

FIG. 13 is a block diagram of a distributed server of a public transportation fee payment system according to an embodiment of the present disclosure.

Referring to FIG. 13, the distributed server 1300 includes a processor 1310, a storage, 1320, and a communication unit 1330.

The processor 1310 may monitor whether a failure has occurred on a communication network between the distributed server and a central server. The processor 1310 may search for another distributed server capable of communicating with the central server, based on the result of monitoring for a failure.

The storage 1320 may store information, such as operating information, including payment data, transaction history, and the like, and downloaded or backed-up information. In an embodiment, the storage 1320 includes a non-transitory computer-readable storage medium, such as a read only memory (ROM) and a random access memory (RAM), and also a higher capacity non-transitory computer readable storage medium. In an embodiment, one or more of these components may be employed in the distributed server 1300 to store a computer code.

The communication unit 1330 may communicate with the central server using the other distributed server. In an embodiment, the communication unit 1330 may set a bypass route passing through the other distributed server by using an ad-hoc function and communicate with the central server through the bypass route.

Figure 14:
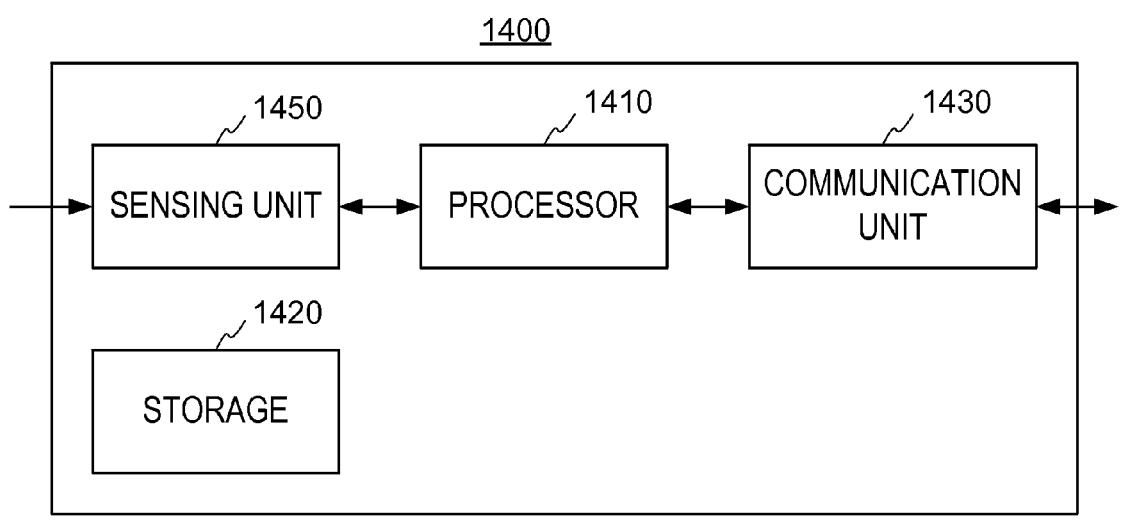
FIG. 14 is a block diagram of a payment terminal of a public transportation fee payment system according to an embodiment of the present disclosure.

FIG. 14 is a block diagram of a payment terminal of a public transportation fee payment system according to an embodiment of the present disclosure.

Referring to FIG. 14, the payment terminal 1400 includes a processor 1410, a storage 1420, a communication unit 1430, and a sensing unit 1450.

The processor 1410 may monitor whether a failure has occurred on a communication network between the payment terminal and a central server. The processor 1410 may search for a distributed server that can communicate with the central server, among a plurality of distributed servers within the communication network, based on the result of monitoring for a failure. The processor 1410 may request the central server to process a payment for a card tagged on the sensing unit 1450 by using a found distributed server.

The storage 1420 may store information, such as operating information, payment data, transaction history, and the like. In an embodiment, the storage 1420 includes a non-transitory computer-readable storage medium, such as a read only memory (ROM) and a random access memory (RAM), and also a higher capacity non-transitory computer readable storage medium. In an embodiment, one or more of these components may be employed in the payment terminal 1400 to store a computer code.

The communication unit 1430 may receive a command from the found distributed server instructing the payment terminal 1400 to independently process a payment.

The sensing unit 1450 may sense a card tagged to the payment terminal 1400. In an embodiment, the sensing unit 1450 may include a contact sensor or RFID (Radio Frequency Identification) reader.

Methods according to embodiments of the present disclosure may be implemented in the form of program commands, which can be executed through various computer units, and then written to computer readable media. The computer readable media may include a program command, a data file, a data structure, or a combination thereof. The computer readable media may include, for example, magnetic media such as a hard disk, a floppy disk and a magnetic tape, optical media such as CD-ROM and DVD, magneto-optical media such as a floptical disk, and hardware devices, such as ROM, RAM and flash memory, configured to store and execute a program command. Examples of the program command may include a machine language code created by a compiler and a high-level language code executed by a computer through an interpreter or the like. The hardware devices may be configured to operate as one or more software modules to perform operations of the present disclosure and vice versa.

While embodiments of the present disclosure have been described, it will be apparent to those skilled in the art that various changes and modifications may be made from the embodiments described herein. For example, the above-described methods may be performed in a different order from the above-described order, and/or the components of the above-described system, structure, device, or circuit may be coupled or combined in a different manner from the above-described system, structure, device, or circuit, or replaced or substituted with other components or equivalents, and a proper result may be achieved.

Thus, the scope of the present disclosure should not be limited by the above-described embodiments. Instead, but the scope of embodiments should be defined by the appended claims and the equivalents to the claims.

What is claimed is:

1. A three-level hierarchical transportation fee payment system comprising a payment terminal, a plurality of distributed servers, and a central server, each of the plurality of distributed servers comprising:
one or more processors;
a non-transitory computer-readable medium having stored thereon a program, which, when executed, causes the one or more processors to perform a method of the distributed server of the three-level hierarchical transportation fee payment system, the method comprising:

monitoring whether a failure has occurred on a communication network between the distributed server and the central server;
searching for another distributed server capable of communicating with the central server, among the plurality of distributed servers, when it is determined that the failure has occurred; and
communicating with the central server through the other distributed server,
wherein the payment terminal processes a payment with the central server through the distributed server when a failure has occurred on a communication network between the payment terminal and the central server,
wherein the plurality of distributed servers are disposed between the payment terminal and the central server, and
wherein communicating with the central server comprises:
setting a bypass route passing through the other distributed server by using an ad-hoc function; and
communicating with the central server through the bypass route.

2. The transportation system of claim 1, wherein the method further comprises transmitting a command for instructing the payment terminal to independently process a payment, when another distributed server is not found within a preset time.

3. The transportation system of claim 2, wherein the method further comprises:
receiving a transaction history including payment data from the payment terminal that has independently processed the payment according to the command; and
storing the transaction history.

4. The transportation system of claim 3, wherein the method further comprises transmitting the transaction history to the central server, after it is determined that there is no longer a failure on the communication network between the distributed server and the central server.

5. The transportation system of claim 3, wherein the method further comprises, if the failure continues after the preset time and the other distributed server is found, transmitting the transaction history to the central server using the other distributed server.

6. The transportation system of claim 1, wherein the method further comprises:
monitoring whether a failure has occurred on the communication network between the payment terminal and the central server; and
performing wireless communication with the central server and performing near-field wireless communication with the payment terminal, if it is determined that the failure has occurred.

7. The transportation system of claim 1, wherein the distributed server is configured to switch between wired communication and wireless communication with the central server, and performs wireless communication with the payment terminal.

8. The transportation system of claim 1, wherein the method further comprises downloading operating information from the central server.

9. The transportation system of claim 8, wherein the method further comprises transmitting the operating information to one or more distributed servers that did not receive the operating information.

10. An operating method of a payment terminal of a three-level hierarchical transportation fee payment system, the method comprising:

receiving data including payment data from a card tagged to a card reader of the payment terminal;

monitoring whether a failure has occurred on a communication network between the payment terminal and a central server;

searching for a first distributed server capable of communicating with the central server, among a plurality of distributed servers within the communication network, based on a result of the monitoring, the plurality of distributed servers being disposed between the payment terminal and the central server; and processing a payment with the central server through the first distributed server.

11. The operating method of claim 10, further comprising:

processing a payment independently when the first distributed server capable of communicating with the central server is not found within a preset time; and storing a transaction history including the payment data based on the processed payment.

12. The operating method of claim 11, wherein the first distributed server backs up the transaction history including the payment data based on the processed payment of the payment terminal, if it is determined that the failure on the communication network between the payment terminal and the central server continues.

13. The operating method of claim 10, further comprising:

if there is a failure on a communication network between the first distributed server and the central server and the first distributed server does not find a second distributed server capable of communicating with the central server, receiving a command from the first distributed server, wherein the command instructs the payment terminal to independently process a payment.

14. The operating method of claim 13, further comprising transmitting a transaction history including the payment data based on the independently processed payment to the first distributed server.

15. The operating method of claim 10, wherein, when a failure has occurred on a communication network with the central server, the first distributed server searches for a second distributed server capable of communicating with the central server and performs communication with the central server using the second distributed server by setting a bypass route passing through the second distributed server using an ad-hoc function, and wherein processing the payment with the central server comprises processing the payment with the central server through the first distributed server and the second distributed server.

16. A three-level hierarchical transportation fee payment system, comprising:

a payment terminal;
a plurality of distributed servers;
a central server,
wherein the plurality of distributed servers are disposed between the payment terminal and the central server, and
wherein the payment terminal comprises:
a sensing unit configured to sense a tagged card; and
a processor configured to monitor whether a failure has occurred on a communication network between the payment terminal and the central server, search for a distributed server capable of communicating with the central server among the plurality of distributed servers within the communication network, based on a result of the monitoring, and request the central server to process a payment for the tagged card using the searched distributed server, and wherein the plurality of distributed servers are configured to monitor whether a failure has occurred on a communication network with the central server, search for another distributed server capable of communicating with the central server when the failure has occurred, and perform communication with the central server using the other distributed server by setting a bypass route passing through the other distributed server using an ad-hoc function.

17. The three-level hierarchical transportation fee payment system of claim 16, wherein the processor is further configured to independently process the payment if there is a failure on a communication network between the distributed server and the central server.

18. The three-level hierarchical transportation fee payment system of claim 17, further comprising a storage configured to store transaction history information including payment information.

19. A three-level hierarchical public transportation fee payment system comprising:

one or more payment terminals configured to request processing of a payment for a tagged card;

one or more distributed servers disposed between the one or more payment terminals and a central server, and configured to monitor whether a failure has occurred on a communication network with the central server, search for another distributed server capable of communicating with the central server when the failure has occurred, and perform communication with the central server using the other distributed server; and the central server configured to forward operating information to the one or more distributed servers, wherein the one or more payment terminals are further configured to monitor whether a failure has occurred on a communication network with the central server, search for a distributed server capable of communicating with the central server when the failure has occurred, and process the payment with the central server using the searched distributed server, and wherein performing the communication with the central server using the other distributed server comprises:

setting a bypass route passing through the other distributed server by using an ad-hoc function; and communicating with the central server through the bypass route.

20. The public transportation fee payment system of claim 19, wherein the payment terminal processes the payment with the central server using the other distributed server that is capable of communicating with the central server when a failure has occurred on the communication network between the searched distributed server and the central server and the other distributed server is found.

* * * * *